United States Patent

[11] 3,579,738

[72] Inventor John O. Beattie
 57 Crawford Terrace, Riverside, Conn. 06878
[21] Appl. No. 874,702
[22] Filed Nov. 8, 1969
[45] Patented May 25, 1971
 Continuation-in-part of application Ser. No. 604,242, Dec. 23, 1966, now abandoned.

[54] APPARATUS FOR CASTING AND THERMALLY CURING PLASTIC SHEETS
 8 Claims, 5 Drawing Figs.
[52] U.S. Cl. .................................................. 18/26, 18/4, 25/29, 18/39
[51] Int. Cl. ................................................. B29c 5/00, B29d 7/02
[50] Field of Search ....................................... 18/26 (M), 26 (R), 39; 249/129

[56] References Cited
UNITED STATES PATENTS

| | | | |
|---|---|---|---|
| 653,235 | 7/1900 | Gray | |
| 2,035,117 | 3/1936 | English | 18/26M |
| 2,154,639 | 4/1939 | Rohm et al. | 18/26M |
| 2,817,878 | 12/1957 | Anspou | 18/39X |
| 2,834,051 | 5/1958 | Rekettye | 18/39X |
| 3,070,846 | 1/1963 | Shrier | 18/26MX |
| 3,131,242 | 4/1964 | Petrie | 18/39 |
| | | | 18/26MX |

Primary Examiner—J. Howard Flint, Jr.
Attorney—Curtis, Morris & Safford

ABSTRACT: An apparatus for casting a plurality of plastic sheets is disclosed. It is comprised of an elevated support track having one or more temperature control cells suspended from it, the cells being enclosed chambers with inlet and outlet ports for the passage of U-shape fluid and at least one sidewall which is suitable as a mold surface of a plastic casting zone. A second mold surface is independently suspended from the elevated support track and is positioned in facing relationship with the first surface, a resilient sealing gasket between the two mold surfaces serving as an edge enclosure for a casting zone. A port in the gasket is provided for feeding casting fluid such as methyl methacrylate. Casting is carried out by applying a pressure to the exterior of the two mold surfaces thereby sealing them against the gasket, filling the casting zone, and effecting polymerization and cure by passing heated water through the temperature control cell.

A liquid plastic feed system is mounted on the frame above the casting zones and includes a plurality of charge vessels connected to a common vacuum producing source and to a common source of liquid plastic, and manifolded to one another at their lower ends to equalize the plastic charge in each vessel. Each vessel is connected via tube to one of the casting zones.

APPARATUS FOR CASTING AND THERMALLY CURING PLASTIC SHEETS

This application is a continuation-in-part of copending application Ser. No. 604,242 filed Dec. 23, 1966 now abandoned.

This invention relates to an apparatus for simultaneously casting a plurality of plastic articles from liquid monomer. More specifically this invention relates to an apparatus for casting and curing a plurality of flat sheets of plastic of uniform thickness with a minimum of labor and a minimum of conveyance of mold surfaces.

Plastic sheet is conventionally formed between two flat, smooth mold surfaces separated by a spacer or a gasket. A clamping device applied to both sides of the casting zone provides a liquid-type assembly. Prepared monomer such as catalyzed methyl methacrylate syrup is poured into the casting zone; air is removed from the mold, usually at the pouring corner; and the casting zone assembly is placed into a suitable air oven or water bath to effect polymerization and cure. During polymerization heat generated by the exothermic reaction is removed by air or water convection. Depending on the thickness of the sheet from 5 to 20 hours may be required and after the sheets have hardened the temperature must be raised for a period of time in order to polymerize residual monomer.

Whatever the composition of the casting syrup or the thermal casting and curing process, the mechanical steps involved in forming the casting zone, conveying it to a suitable heat transfer bath, controlling the temperature within the casting zone and dismantling the casting zone to remove finished product are a substantial source of manufacturing difficulty. A preferred mold surface is glass as it has a smooth, easy to clean surface and is available in many different sizes. Plate, sheet or tempered glass may be used. As it is necessary in conventional processes and apparatus to convey casting zones comprised of glass sheets from one area of the manufacturing plant to another and these molds are invariably heavy and delicate and extremely vulnerable to mechanical shock, transferring them has in the past been a very costly operation. Although ingenious mechanical conveyors for glass molds have been devised, these are expensive, space consuming and not altogether satisfactory.

A further disadvantage in the conventional casting of plastic in zones comprised of glass sheet is in the very substantial amount of hand labor required to place the gaskets between the glass sheets when forming a casting zone and to put clips on them to make the casting zone liquidtight. Movement of the assembled casting zones across the uneven floor of a casting plant results in substantial glass breakage which is not only costly per se but adds to the difficulties in scheduling production. Still further the thickness tolerance of the large plastic sheets produced according to the conventional method is extremely poor due primarily to the sagging of the glass on the frames and nonuniform stresses produced by the sealing clips. Other distortions also occur and the poor thickness tolerance not only deters sale of large sheets but makes it necessary to cut down large sheets into small ones. Lastly each production sheet requires its own inventory of glass mold surfaces thereby increasing the amount of working capital required and occupying a large area of the casting plant.

In addition to the difficulties encountered in the assembly and conveyance of glass sided casting zones, the conventional casting processes have been complicated by the temperature control equipment necessary to effect the polymerization of the monomer charge. Once the molds are poured the casting syrup must be subjected to heat, either by air heating in an oven or by water heating in a curing bath, for sufficient time to be fully polymerized. In the casting of methyl methacrylate sheets the glass molds are maintained at a temperature between 50° and 75° C. for a period of from 6 to 20 hours if the cure is effected by heat in an oven and a like or smaller amount of time if the cure is effected in a water bath. The time required depends of course on the thickness of the sheets and the catalytic additives added to the monomer charge. The "runup" which is discussed above in methyl methacrylate casting is carried out at a temperature of approximately 100° C. and this may require 3 to 5 hours in an air curing process.

After the plastic sheets have polymerized, the molds must be disassembled and the casting sheets extracted. This requires more time and labor and typically the glass plates used in the molds must be washed before they can be reused. This is primarily due to the fact the unremoved polymerized material interferes with the next casting. Contaminents remaining around the edges of the glass plates after the cast sheets are removed must be washed away lest they fall out on the bottom glass surface during curing thereby ruining the surface quality of the cast sheet. This is a particular disadvantage of conventional casting processes wherein the casting zones are maintained in a horizontal orientation.

Still a further inadequacy in conventional processes for casting plastic sheets is in the feed of monomer or partial polymer to the casting zones. Typically, the monomer must be carefully weighed to determine each charge and then must be transferred to the casting zone in such way as to avoid absorbing air. Weighing each quantity of casting syrup and then pouring it into a mold is time and labor consuming, difficult to perform without absorbing air in the charge and inefficient in that inevitable losses occur due to leakage, adhesion, evaporation and emission of objectional fumes into the casting area. Where air is absorbed the final product invariably is voided.

It is therefore the primary object of this invention to provide an apparatus for the simultaneous casting of a plurality of plastic sheets in a semicontinuous manner with a minimum of labor and glass breakage in the assembly and disassembly of the casting zones.

It is a further primary object of this invention to provide a casting apparatus whereby the casting process can be carried out in as short a period of time as is consistent with production of high quality sheets and which produces sheets having close thickness tolerance.

It is a further and related primary object of this invention to provide a casting apparatus which permits the temperature control function to be carried out with a minimum of mechanical handling of the assembled casting zones and in a minimum of plant space.

It is still a further primary object of this invention to provide an apparatus which permits the simultaneous casting of a plurality of flat plastic sheets in a semicontinuous manner and which requires a minimum of downtime between casting cycles in order to clean the elements of the casting zones.

It is still a further object of this invention to provide a casting apparatus which can produce different sizes and shapes of cast plastic sheets with the same casting zones elements and temperature control equipment.

It is another and related object of this invention to provide a feed system for a plurality of casting zones which eliminates the necessity of weighing out individual charges of monomer, reduces the physical handling thereof, insures a like supply of monomer to each casting zone and reduces the losses and problems inherent in spillage, evaporation and leakage of the monomer.

It is a further and related object of this invention to avoid the trapping of air in the feed to the casting zones and to reduce air inclusions which result in voided sheets.

These and other objects of this invention are achieved in an apparatus for casting plastic which is comprised of an elevated support track with a plurality of plastic casting zones suspended from it. The casting zones include two flat mold surfaces in confronting relationship separated by a resilient sealing gasket positioned between them as an edge closure. The mold surfaces are suspended from the elevated support track and are movable along it. These mold surfaces may be individual sheets of glass in vertical orientation suspended from the elevated track or they may be the surface of one or more temperature control cells which are likewise suspended from that track, the temperature control cells comprising an enclosed chamber with inlet and outlet ports for the passage of a heat transfer fluid. The temperature control cell has at least one sidewall suitable as a mold surface and in the preferred embodiment, both sidewalls are suitable as mold surfaces. A clamp is provided in contact with the exterior of the plurality of casting zones formed from temperature control cell(s) and/or individual sheets of glass for tightly sealing the mold surfaces against their intermediate sealing gaskets in order to provide liquid tight casting zones.

In a preferred embodiment the intermediate gasket between confronting glass mold surfaces is supported on a gasket holder affixed to the outer periphery of one of the mold surfaces, the holder including means for supporting the gasket in the desired position. Alternatively the gasket may be supported on a gasket frame independently suspended from the elevated support track. This design provides a substantial measure of flexibility in the casting of sheets of various sizes, as gasket frames of different sizes can be emplaced between the confronting mold surfaces in order to cast different size plastic sheets.

The apparatus furthermore consists of a liquid plastic feed system mounted on a frame to which the elevated track is attached and including a plurality of charge vessels each connected to a common vacuum-producing means a common source of liquid plastic and to one another via a common manifold attached at their lower ends. By means of this feed system the plastic charge need not be measured for any one of the plurality of casting zones but rather a single master charge can be measured and then distributed via the common source to the evacuated charge vessels, the common manifold insuring equal distribution to each of the charge vessels.

Figure 1:
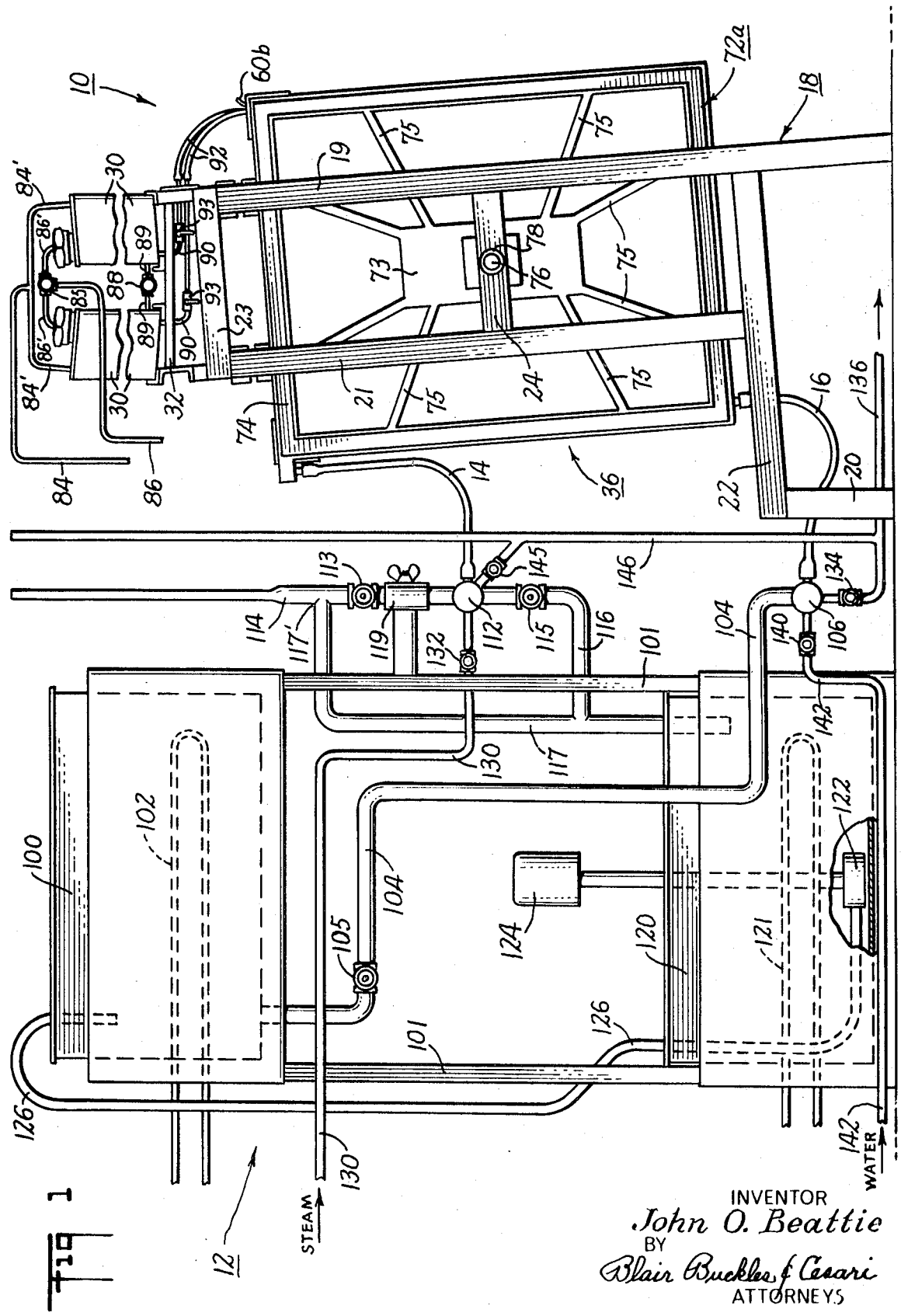
FIG. 1 is a side elevation view of the plastic sheet casting and curing apparatus.

In FIG. 1, reference numeral 10 designates a plastic sheet casting station 10 and reference numeral 12 designates a curing-fluid-handling station 12 interconnected by a first series of hose, commonly shown at 14, and a second series of hose commonly shown at 16. The component parts of casting station 10 are supported by a frame, identified by reference numeral 18. The frame includes, at each end, upright supports 19, 20 and 21, joined together by a lower brace 22. End supports 19 and 21 are joined by upper braces 23 and middle braces 24 and elongated end supports 19 are joined by upper and lower cross braces 25 and 26, respectively, spanning the front of frame 18. The upper ends of upright supports 21 are joined by an upper cross brace (not shown) and the upper ends of upright supports 20 are joined by a lower cross brace (not shown) each spanning the rear of frame 18. A pair of elongated channels 28a and 28b (FIG. 3) are welded to the underside of the front and rear upper cross braces. The four channels which comprise an elevated support track accommodate a plurality of casters 29. A plurality of fluid plastic charge vessels 30 are supported on a shelf 32 mounted atop frame 18. Frame 18 is tilted slightly off-vertical for reasons which will be discussed below.

A plurality of rectangular mold members, commonly designated by reference numeral 36 are individually, vertically suspended from channels 28a and 28b via casters 29. Pairs of casters 29, support each mold member 36 at spaced points along the elevated track, adjacent mold members being readily movable to and from one another.

Figure 2:
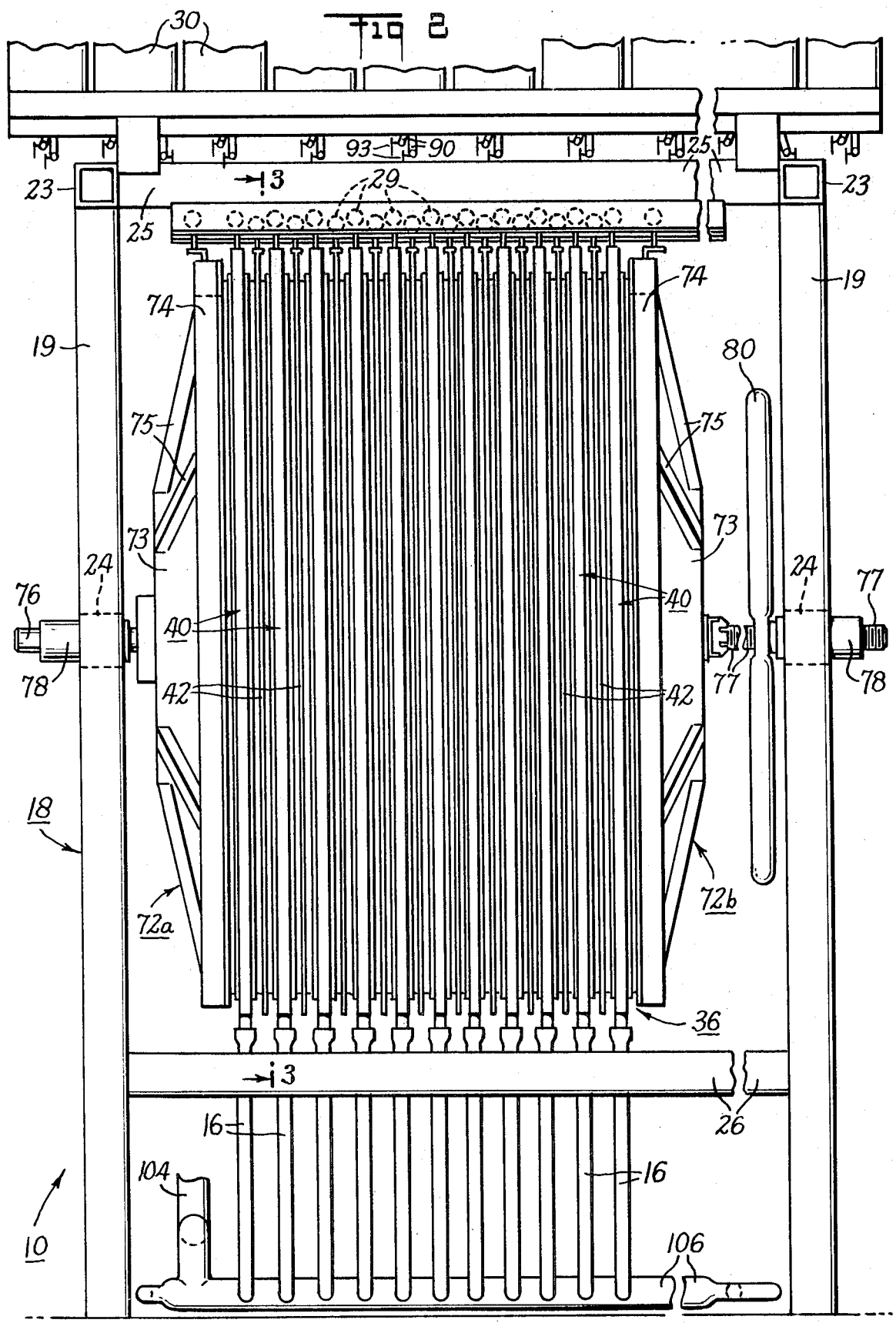
FIG. 2 is a front elevation view of the apparatus of FIG. 1.
Figure 3:
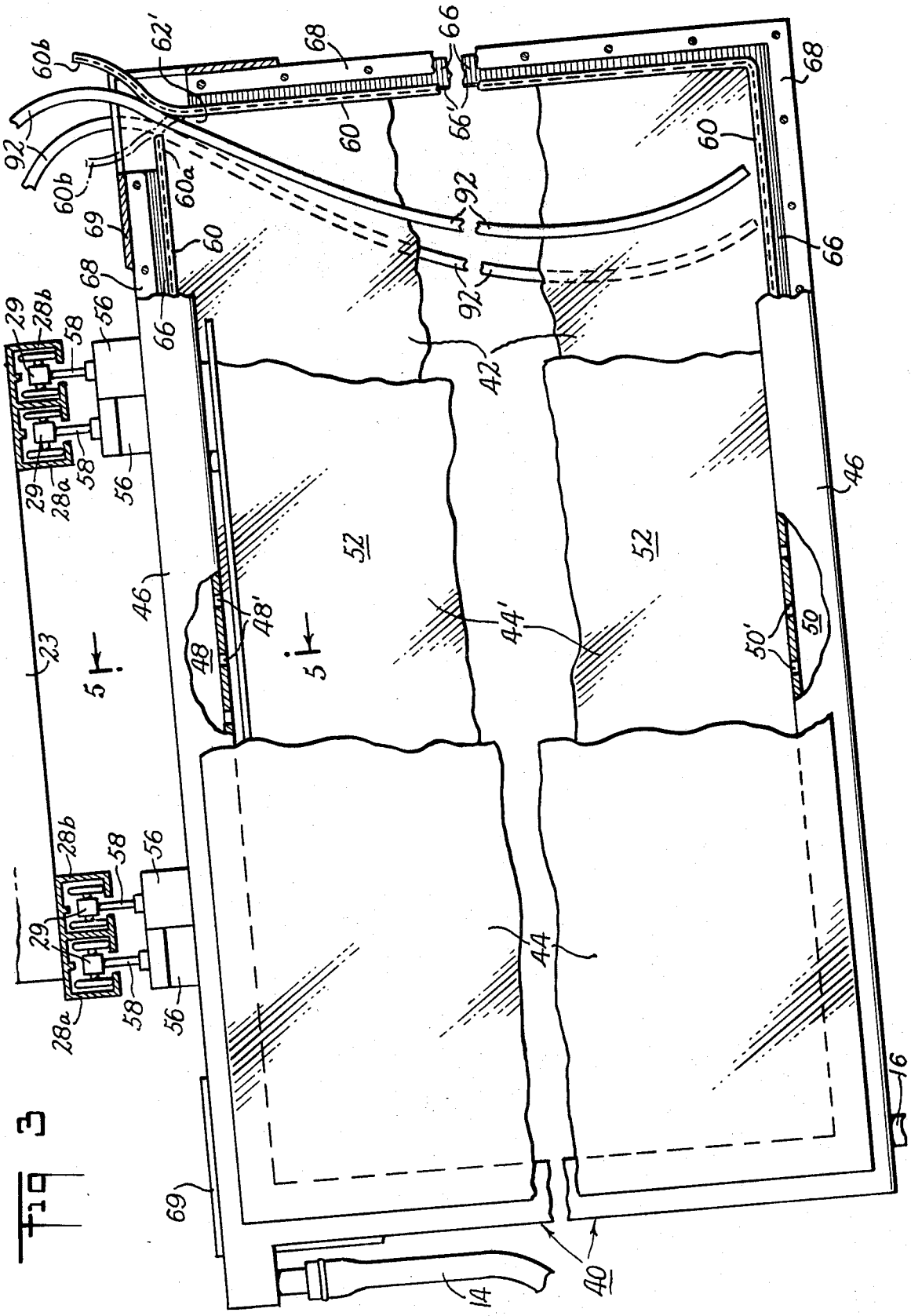
FIG. 3 is a side elevation view, partially broken away, of a temperature control cell through which curing fluid is circulated and of a single plate of glass which defines a casting zone with the temperature control cell.
Figure 4:
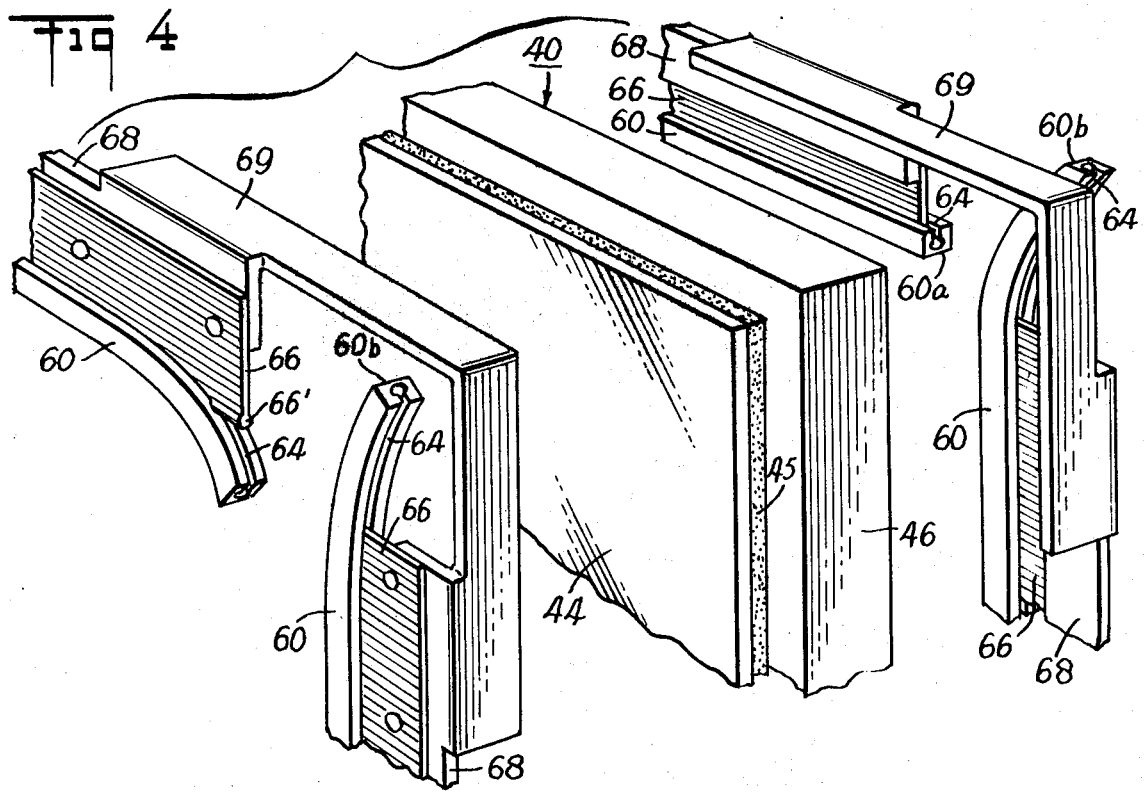
FIG. 4 is a fragmentary exploded view of a temperature control cell and a pair of gasket frames which hold the marginal sealing gaskets.
Figure 5:
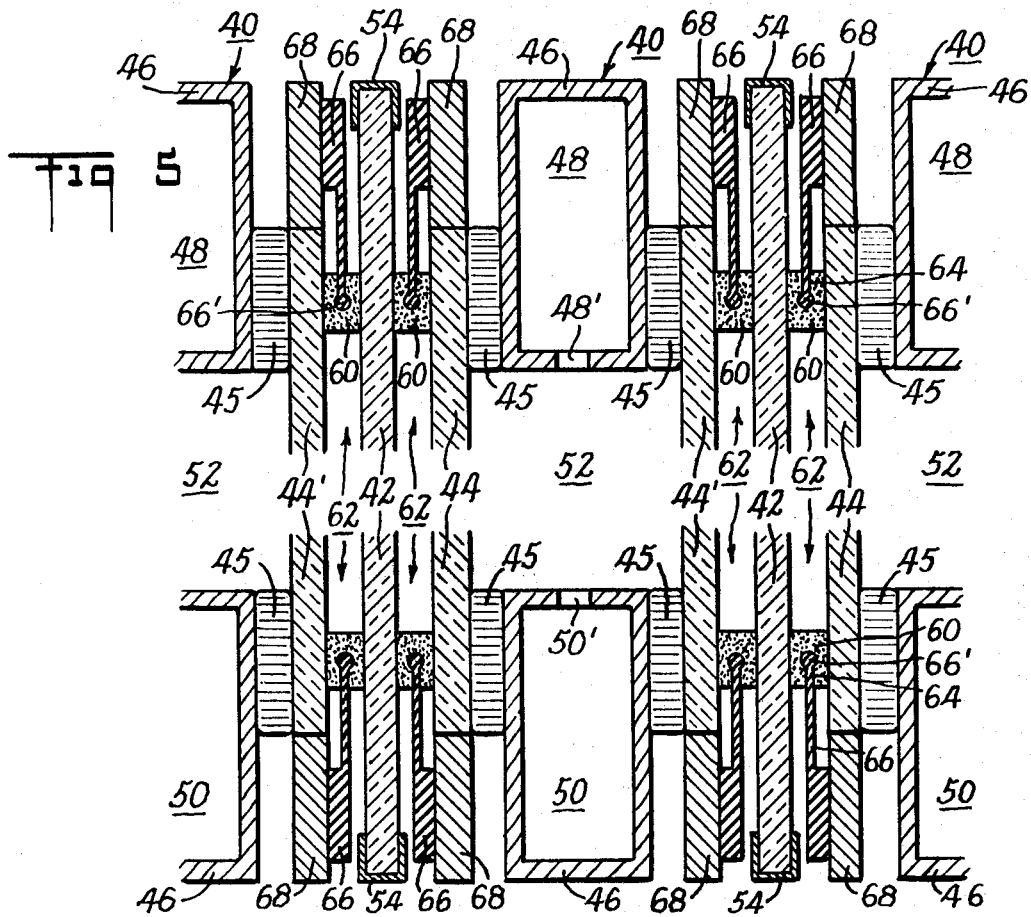
FIG. 5 is a sectional view taken along line 5–5 of FIG. 3.

As shown in FIGS. 2, 3, and 5, mold members 36 include rectangular temperature control cells designated by reference numeral 40, alternating with rectangular plates of tempered glass 42 commonly known as lights. Cell 40 (FIG. 5) comprises two parallel spaced plates of tempered glass 44 and 44' cemented to a marginal rubber seal 45 which is in turn cemented to a rectangular aluminum frame 46. The glass sheets 44 and 44' form in combination with seals 45 and 46 a fluid-tight assembly. The upper and lower horizontal sections of each cell frame 46 are hollow to provide compartments 48 and 50. A hose 14 connects compartment 48 to the curing-fluid-handling station 12 and a hose 16 similarly connects compartment 50 to that station. Apertures 48' and 50', distributed along the lengths of compartments 48 and 50, permit the passage of curing fluid to and from chamber 52 formed between the tempered glass plates 44 and 44'.

Each glass plate 42 interposed between adjacent temperature control cells 40, is mounted in an aluminum frame 54. Support fixtures 56 attached at spaced points along the upper edges of frames 46 and 54 are connected to support rods 58 carried by each of the casters 29. Thus mold members 36 are vertically suspended in edgewise fashion and by virtue of casters 29 can be removed horizontally relative to one another for purposes to be hereinafter discussed.

Gaskets 60, which are strips of a suitable material such as vinyl, are interposed as continuous marginal seals between each glass plate 42 and the glass plates 44 and 44' of each temperature control cell 40. Thus each gasket 60 with a surface of a glass plate 42 and an outer surface of one of the glass plates 44 or 44' form a sheet-casting zone 62. With the assemblage of the cells 40 and the glass plates 42 in side-by-side relationship the plurality of casting zones 62 are each adjacent on one side to a curing fluid chamber 52 through which curing fluid is circulated. Gaskets 60 also serve as spacers and by their size establish the thickness of the sheet cast.

Eleven water cells 40 are shown in FIG. 2 and between each pair of such cells are two casting zones 62 separated by glass plates 42. Twenty sheets can therefore be cast simultaneously. It has been found that this arrangement is efficient for casting plastic sheets up to thicknesses of one-quarter inch. For thicker plastic sheets, one-half inch or more, it is recommended, in order to achieve efficient curing, that the intermediate glass plate 42 be removed, and a single sheet be cast between adjacent temperature control cells. This arrangement disposes a curing fluid chamber 52 adjacent to both sides of each casting zone. Other arrangements of temperature control cells and lights can be used to suit particular demands and manufacturing procedures.

Each gasket 60 is provided with a groove 64 throughout its length. An elongated, flexible flange 66 extends from each of the four sides of a rectangular gasket frame 68, which fits over glass plates 44 and 44'. Each cell 40 supports two gasket frames. The free edge of each flange 66 is beaded at 66' for insertion in gasket groove 64 in order to support gasket 60 and define the four marginal edges of each casting zone 62. One corner of each gasket frame 68 is cut back, as indicated at 69, to facilitate pouring of plastic charge into the casting zones 62. Since gasket 60 adheres to the cast sheet once it is cured, the flexibility of flanges 66 permits ready release of the gasket as the cast sheet is removed from the casting zone.

The mold members 36 are clamped together in sandwich relationship by spider clamps 72a and 72b located at either end of the assemblage. Each spider clamp has a central hub 73 joined to a rectangular clamping frame 74 by a plurality of spokes 75. The rectangular configuration of each clamping frame conforms to the configuration of the marginal sealing gaskets 60 so that clamping force is exerted directly over the gaskets and evenly along all four sides of the casting zones 62. In practice, it is desirable to affix a resilient strip on the inner face of clamping members 74 in alignment with gaskets 60 to limit the clamping forces to the width of such gaskets. In this manner clamping forces tending to bow the glass plates are avoided, casting zone leakage is avoided, and cast plastic sheet of improved thickness tolerance is obtained.

The hubs 73 of spider clamps 72a and 72b are suitably keyed to the ends of screw shafts 76 and 77 which are slidingly received in sleeves 78 which extend through braces 24 of frame 18. Shafts 76 and 77 are thus axially fixed in position. A crank or wheel 80, threaded on shaft 77 and bearing against the end of sleeve 78, is rotated to advance shaft 77 to the left and thereby clamp the assemblage of mold members 36 together between spider clamps 72a and 72b.

Each of the casting zones 62 has a separate charge vessel 30 assigned to it from which a castable fluid is poured. Branch conduits 84' connected to each vessel 30 are coupled to a main conduit 84 which is, in turn, connected to a vacuum pump (not shown) for simultaneous evacuation of the containers. Vessels 30 are also connected through conduit branches 86', valve 85 and main conduit 86 to a master feed drum (not shown) filled with a weighed quantity of suitable plastic fluid material sufficient to cast sheets in each of the casting zones 62. The casting material may be any of a variety of plastic resins, for example, methyl methacrylate, capable of polymerization under the influence of heat.

The filling procedure is as follows. The vessels 30 are first evacuated. Then valve 85 is opened and liquid methyl methacrylate flows through main conduit 86, branch conduits 86' and into vessels 30. When the master feed drum is emptied, the vacuum pump is shut off and valve 88 is opened to interconnect all of the vessels 30 through manifold conduit 89, thereby automatically distributing the liquid into equal amounts, commonly referred to as "shots." Valve 88 is then closed. This method of loading vessels 30 requires only a single weighing operation to assure that the proper amount of charge fluid is poured into each casting zone 62.

Each vessel 30 is connected to a separate conduit 90, valve 93 and flexible tube 92. The flexible tube 92 extends into each casting zone 62 through a gap between the ends 60a and 60b of gasket 60 at the elevated corner 62'. When zones 62 are being filled tube 92 extends nearly to the bottom. Mold members 36 are clamped together by clamps 72a and 72b during the filling operation and preferably valves 93 are interconnected and controlled by a single operating lever so that casting zones 62 may be filled simultaneously. As seen in FIG. 1 vessels 30 are supported on shelf 32 in tilted fashion and conduits 90 are connected to their bottommost points so that all of their inventory drains completely. The tilting of the casting zones 62 facilitates the bleeding of air during and after filling.

When vessels 30 are emptied, tubes 92 are withdrawn from the casting zones. Ends 60a and 60b of gaskets 60 are brought together leaving very small gaps through which additional air may escape. Due to the hydrostatic pressure of the plastic in each casting zone, the tempered glass plates 44 and 44' of each temperature control cell are bowed concavely. Consequently the fill level in each zone is only about two-thirds of the full height of the zone and air must be bled from each zone before it is closed off.

With the apparatus described, the vessels 30 and zones 62 are filled with little chance of air, grease or dirt contamination of the charge liquid. Consequently, pure monomer rather than casting syrup, may be used and the time, labor, and equipment required in the preparation of the casting syrup is avoided.

The curing fluid handling station 12 has an elevated tank 100 supported by upright support members 101. Tank 100 contains water heated to proper curing temperature by steam circulated through a U-tube 102. The appropriate curing temperature is determined by the type of plastic being cast and the type and amount of catalyst added to it. For methyl methacrylate the temperature may range from 55° to 75° C. The heated water in the elevated tank 100 drains through a pipe 104 and valve 105 to a lower compartment 50 of each temperature control cell frame 46 through individual hoses 16. Thus, the heated water flows by gravity from tank 100 to fill the chambers 52 between glass plates 44 and 44'. The hydrostatic pressure of the water rising in chambers 52 eventually overcomes the hydrostatic pressure of the casting zone fill eliminating the concavity of glass plates 44 and 44'. The fill level in each casting zone rises and the remaining air escapes through the small gap left in sealing gasket 60. When all the air has been exhausted from the casting zones and the liquid charge begins to trickle out, ends 60a and 60b of gaskets 60 are brought together to close off the casting zones.

The heated water, after filling chambers 52, enters upper compartments 48 and is drawn off through individual hoses 14 to an upper manifold 112. A valve 113, positioned in a pipe 114 extending upwardly from manifold 112, and a valve 115, positioned in a pipe 116 extending below manifold 112, are both initially opened. A pipe 117, joined with pipe 114 at junction 117' and with the end of pipe 116, carries the water from manifold 112 to a lower tank 120. With both valves 113 and 115 open, the water surges through chambers 52 creating a siphon effect and drawing off air pockets in the elevated corners of chambers 52. Lower valve 115 is then closed, and the water from manifold 112 rises in pipe 114 to junction 117' where it is carried off through pipe 117 to tank 120. The height of junction 117', which is open to the atmosphere through the open, upper end of pipe 114, may be adjusted by way of bracket clamp 119 on support 101. This adjustment is made so that the water in chambers 52 exerts a slightly positive pressure on glass plates 44 and 44' relative to the fill in casting zoned 62. It will be appreciated that the water pressure in chambers 52 cannot be so positive as to force the fill in zones 62 through sealing gaskets 60 or so negative as to draw air into the molds.

The water in lower tank 120, now somewhat cooled after flowing through the temperature control cells 40 from elevated tank 100, is reheated by steam circulated through submerged U-tube 121. A sump pump 122, driven by motor 124, returns the water from lower tank 120 to elevated tank 100 through pipe 126.

The recirculation of heated water through the individual cells 40 continues for sufficient time to take the sheets cast in zones 62 through the exotherm phase of the curing process, after which the charge, methyl methacrylate for example, is substantially polymerized. During the exotherm phase, the temperature of the cast sheets tends to rise as a result of the reaction taking place. The circulating water carries off excess heat, maintaining the cast sheets at substantially uniform curing temperature. Once the exotherm phase is completed, valves 105 and 113 are closed to terminate heated water circulation.

Some residual monomer remains in the cast sheets however, and to polymerize this residual monomer, the temperature must be run up to 100° C. Live steam is introduced in pipe 130 and enters upper manifold 112 through open valve 132. From the upper manifold the steam is piped to the upper compartments 48 of each cell 40 via hoses 14. The water and condensed steam in chambers 52 of the water cells is forced out through hoses 16 to the lower manifold 106 and is then drained off through open valve 134 and pipe 136. Because of the relatively small mass of water cells 40, the temperature of the cast sheets can be raised from the lower water-curing temperature to the higher live steam curing temperature in approximately 5 to 10 minutes. The final curing temperature is maintained for approximately one-half hour to an hour, or longer according to the thickness of the cast sheets. In any event this high temperature is maintained until the sheets in the zones 62 are completely polymerized. Valves 132 and 134 are closed at the completion of the curing step.

To separate the cast sheets from the tempered glass of the casting zones, the clamped assembly is first cooled down. Valve 134 is opened and cold water conveyed to lower manifold 106 through pipe 142 and then through hoses 16 to the chambers 52. The cold water in chambers 52 is drained off through hoses 14, upper manifold 112, valve 145, vertical pipe 146, and drain pipe 136. This cooling process requires 5 to 10 minutes and effectively achieves the separation of all of the cast sheets from their casting surfaces. Drain pipe 136 is open to the atmosphere through vertical pipe 146 to prevent the outer glass plates 44 and 44' of the outermost water cells of the clamped assembly from being crushed by atmospheric pressure as this cooling takes place.

With separation achieved, the assemblage of mold members 36 is unclamped by turning the crank 80 and moving the shaft 77 to the right. The spider clamp 72b can then also be moved to the right. With clamping pressure removed, the adjacent mold members 36 are readily separated and the cast sheets are easily removed. Separation of the mold members is simplified by their suspension from casters laterally movable in channels 28a and 28b. After each cast sheet is extracted, with gaskets 60 adhered, the associated empty gasket frame 68 is also removed. By having an additional set of gasket frames which can be fitted with gaskets during the curing process, a newly gasketed frame can be immediately substituted for the empty gasket frame, thus minimizing down time. Vessels 30 are refilled with monomer during polymerization so that they also are ready for the next pour. As soon as all of the cast sheets have been extracted, and the gasketed frames 68 mounted on the several temperature control cells 40, the next casting process can be immediately instituted.

The apparatus of this invention can be used to cast numerous differently shaped and sized plastic products from a variety of monomer or partial polymer starting materials. Cast articles can be made from methyl methacrylate, styrene, allyl diglycol carbonate, copolymers of methyl methacrylate with allyl diglycol carbonate, glycol dimethacrylate or similar cross-linking agents, styrene, styrene-acrylonitrile copolymer and other monomeric resins. The apparatus is not limited to the casting of sheets although it is best adapted for that purpose.

The advantages inherent in the apparatus are manifold. The reduction in labor required to prepare the monomer or partial polymer charge and to cast the finished products is dramatic since there is virtually no movement of molds from one place to another or conveyance of raw material from one place to another. A related advantage which alone provides great savings in cost of production stems from the reduced breakage and scratching of glass which inevitably occurs when molds are transferred, lifted, or otherwise handled during the precasting, casting or postcasting operations. Still a further related advantage is in the storage of the glass mold surfaces. The frame, with temperature control cells and lights suspended from it is a ready means and location for storing the mold elements when they are not in use. It is not necessary to provide conventional harp racks, dollies, and other glass storage equipment.

The apparatus as described herein greatly increases the rate at which plastic sheet or other articles can be produced because of the far greater heat transfer coefficients achieved in the temperature control cells as compared with the curing ovens or water baths of conventional processes. The rapid passage of water or steam through the temperature control cells substantially reduces the periods of time required to effect a cure. Alternatively, it is possible to polymerize and cure thicker sheets than has heretofore been possible. It is, of course, possible to use any suitable heat transfer fluid in the temperature control cells and both liquid and gas phase media can be employed.

Since it is possible to produce different sized sheets on the same assembly, merely by changing the area enclosed by a gasket, it is possible to cast different size sheets using the same temperature control cells and lights. This flexibility substantially reduces the finished stock inventory required and likewise reduces working capital.

The product produced by the apparatus of this invention is improved both in regard to thickness tolerance, surface quality and internal homogeneity. Casting takes place in vertically oriented casting zones and thus there is no bowing of the glass due to sag in the frames or glass mold surfaces. Nor is there saddle distortion due to uneven elevation of the four frame clips of conventional processes. In this apparatus the clamping pressure is applied directly above the gaskets without a bending interior bowing moment. Impurities or inclusions which are incorporated in the monomer charge fall to the bottom edge of the casting zone and do not ruin the surface or the interior of the cast sheet. Simply by trimming the gasket and a small amount of the edge of the cast sheet, all the inclusions are removed. The result is high yield on raw material and high quality product. Still further the glass mold surfaces need not be cleaned after wet casting since the dirt and impurities removed themselves from the casting zone.

The investment required for the apparatus is substantially lower than that required for conventional ovens, water baths and conveyors and far less space is required. Power requirements are likewise reduced as there is no need for blowers or pumps to drive the heat transfer medium as is required in conventional processes and the cost of inspecting finished sheets is reduced. Still a further advantage is that the casting zone can be filled with monomer rather than a partially polymerized syrup as was heretofore necessary to avoid aeration of the charge during pouring procedures. The use of monomer is advantageous in that it does not adhere to the sidewalls of the containers and there is no evaporation loss as was experienced during the boiling of monomer in conventional processes. Emission of fumes is greatly reduced, the monomer flows faster into the casting zones and there is decreased opportunity for the material to set up. The feed procedure is simplified in that partial polymerization to a predetermined viscosity is obviated and the optics of the final product sheet are more uniform.

I claim:

1. An apparatus for casting plastic comprising: an elevated support track; a temperature control cell suspended from said track and movable therealong, said cell comprising an enclosed chamber having inlet and outlet ports for passage of heat transfer fluid and having at least one sidewall suitable as a first mold surface of a plastic casting zone; a second mold surface independently and movably supported on said elevated support track in confronting relationship with said first surface; a resilient sealing gasket positioned between said mold surfaces as an edge closure for said casting zone, said gasket having a port therein for feeding casting fluid to said casting zone; and means in contact with the exterior of the casting zone so formed for tightly sealing said mold surfaces against said gasket.

2. The apparatus of claim 1 wherein the outer periphery of one of said mold surfaces includes a gasket holder, said holder including means for supporting said gasket in the desired position between mold surfaces.

3. The apparatus of claim 1 wherein said second mold surface is a sidewall of a second temperature control cell suspended from said elevated track, the casting zone thus having temperature control surfaces at both sides.

4. The apparatus of claim 1 wherein said second mold surface is one side of a first mold member suspended from said elevated support track.

5. The apparatus of claim 1 wherein a plurality of mold members form a plurality of casting zones in association with a temperature control cell, said temperature control cell and mold members being independently mounted on antifriction bearings positioned in said elevated track.

6. The apparatus of claim 1 wherein said resilient gasket is supported on a gasket frame independently suspended from said elevated support track.

7. An apparatus for casting a plurality of flat sheets of plastic comprising: an elevated frame; a track attached thereto; a plurality of casting zones and temperature control cells suspended from and movable on said track, said casting zones including two vertically oriented, parallel glass surfaces in confronting relationship with a sealing gasket positioned between them as edge closure, said temperature control cells comprising vertically oriented, enclosed chambers having inlet and outlet ports for passage of heat transfer fluid and at least one flat glass surface, there being at most two cells forming each casting zone and there being at most two cells forming each casting zone and there being at least one cell adjacent to a series of three casting zones; a liquid plastic feed system mounted on said frame above said casting zones, said feed system comprising a plurality of charge vessels each connected to a common vacuum producing means and to a common source of liquid plastic, and manifolded to one another at their lower ends to equalize the plastic charges therein, each of said vessels being connected via tube to one of said casting zones through a port in the sealing gasket thereof; and press means at the exterior surfaces of the endmost elements of said plurality of casting zones and temperature control cells to tightly seal said casting zones.

8. The apparatus of claim 7 wherein said casting zones and temperature control cells are rectangular in shape and are suspended from said elevated track with the top edge at an angle to the horizontal, the uppermost corner of said casting zones providing an escape opening for gases trapped therein during filling, the lower corner providing a site for accumulations of inclusions in the plastic feed and the elevation of the outlet from said temperature control cell being placed at a height above said cell so that the hydrostatic pressure therein compensates the static pressure in an adjacent casting zone.